US012626021B2

(12) United States Patent
Schnellinger

(10) Patent No.: US 12,626,021 B2
(45) Date of Patent: May 12, 2026

(54) SECURE ELEMENT WITH ACCESS RULE APPLICATION ARA

(71) Applicant: GIESECKE+DEVRIENT MOBILE SECURITY GERMANY GMBH, Munich (DE)

(72) Inventor: Michael Schnellinger, Landshut (DE)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 38 days.

(21) Appl. No.: 18/715,912

(22) PCT Filed: Dec. 8, 2022

(86) PCT No.: PCT/EP2022/025556
§ 371 (c)(1),
(2) Date: Jun. 3, 2024

(87) PCT Pub. No.: WO2023/104334
PCT Pub. Date: Jun. 15, 2023

(65) Prior Publication Data
US 2025/0028862 A1    Jan. 23, 2025

(30) Foreign Application Priority Data

Dec. 9, 2021    (DE) ..................... 10 2021 006 083.0

(51) Int. Cl.
*G06F 21/62*        (2013.01)
*G06F 21/44*        (2013.01)
(52) U.S. Cl.
CPC ............ *G06F 21/629* (2013.01); *G06F 21/44* (2013.01)

(58) Field of Classification Search
CPC ..................................................... G06F 21/629
See application file for complete search history.

(56) References Cited

U.S. PATENT DOCUMENTS

| 8,196,131 B1 | 6/2012 | Von Behren et al. |
| 2016/0132880 A1 | 5/2016 | O'Regan et al. |
| 2021/0014682 A1 | 1/2021 | Kamal |

FOREIGN PATENT DOCUMENTS

| EP | 2827274 A1 | 1/2015 |
| EP | 2890171 A1 | 7/2015 |

OTHER PUBLICATIONS

GlobalPlatform Device Technology, Secure Element Access Control, Version 1.1, Public Release, Sep. 30, 2014, 122 pages.

(Continued)

*Primary Examiner* — Simon P Kanaan
(74) *Attorney, Agent, or Firm* — Workman Nydegger

(57)        ABSTRACT

A secure element includes an SE application implemented therein or configured to implement an SE application therein. The secure element includes: an SE terminal interface to a terminal, in conjunction with which the secure element is able to be operated; an ARA application (ARA-X) and ARA access rules, by way of which access operations from applications implemented in the terminal to SE applications implemented or able to be implemented in the secure element via the SE terminal interface are controlled. The secure element is: an ARA user interface (ARA-UI), which is configured: to receive user commands that are input by a user on a user interface provided on the terminal or on the secure element; to forward received user commands to the ARA application; and to prompt the ARA application to apply forwarded user commands to the ARA application.

15 Claims, 3 Drawing Sheets

ARA-X = ARA-M / ARA-C / ARA-D

(56)                    References Cited

OTHER PUBLICATIONS

GlobalPlatform Technology, Open Mobile API Specification, Version 3.3, Public Release as early as Jul. 1, 2018, 105 pages.
GlobalPlatform Device Technology, Device API Access Control, Version 1.0, Public Release as early as Nov. 1, 2017, 65 pages.
GSMA SGP.22 RSP Technical Specification, Version 2.2.2, Jun. 5, 2020, 268 pages.
German Search Report from corresponding DE Application No. 102021006083.0, Aug. 29, 2022.
International Search Report from corresponding PCT Application No. PCT/EP2022/025556, Mar. 23, 2023.

Prior art:
[1] [GPD_SPE_013] GlobalPlatform Device Technology,
Secure Element Access Control, Fig. 2-1

Prior art:
[1] [GPD_SPE_013] GlobalPlatform Device Technology,
Secure Element Access Control, Fig. 2-2

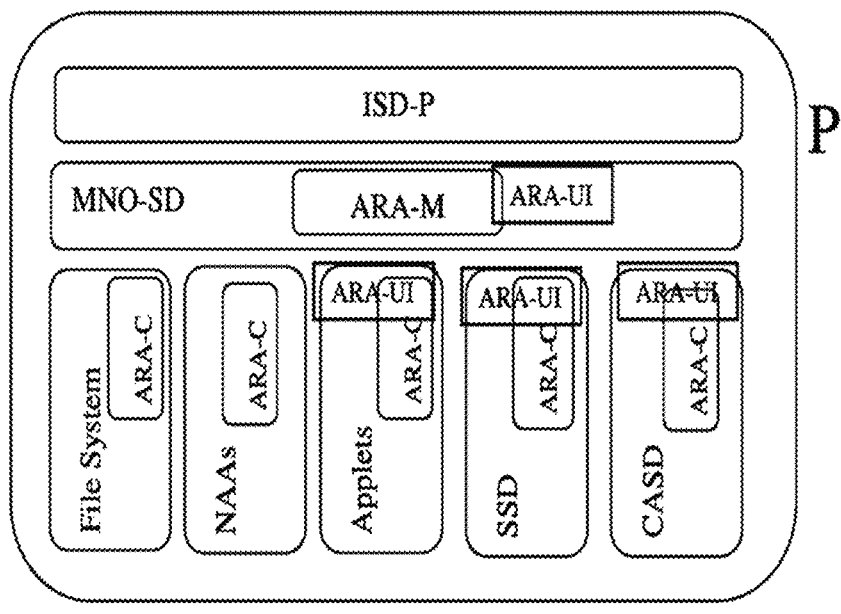
SGP.22/02 eUICC + ARA + ARA-UI     Fig. 3
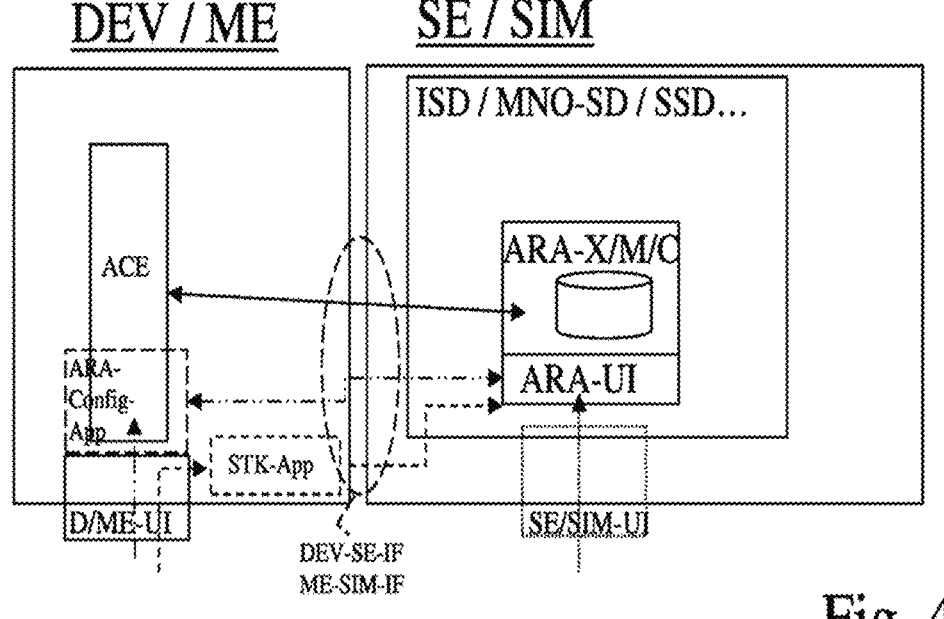
Fig. 4

ARA-X = ARA-M / ARA-C / ARA-D

ARA-X = ARA-M / ARA-C / ARA-D

SECURE ELEMENT WITH ACCESS RULE APPLICATION ARA

FIELD OF THE INVENTION

The invention relates to a secure element, in particular a subscriber identity module (SIM) for operation in a mobile terminal, and an access rule application, ARA application, by means of which the access by the mobile terminal to applications in the secure element is controlled.

Mobile (mobile radio-enabled) terminals communicate via cellular networks. Classic mobile terminals include smartphones and mobile phones. Mobile terminals also include automotive telematics devices and control devices (control devices or measuring instruments or combined control/measuring devices) for industrial facilities in the commercial or private sectors. Industrial facilities are, for example, production facilities that have one or more control devices (terminals) that can communicate with a background system or/and with one another via a cellular network. Other industrial facilities include smart home equipment such as heating systems or electricity consumers with terminals in the form of control devices.

To use a mobile terminal in a cellular network of a network operator, the subscriber identity module operated in the mobile terminal contains one or more subscription profiles, or profiles for short. The profile handles the configuration of the terminal and the connection of the terminal in the cellular network. The profile comprises profile data that enables the establishment, operation and disconnection of the terminal in the cellular network, for example a cryptographic authentication key Ki and an International Mobile Subscriber Identity IMSI. Furthermore, each profile can comprise applications.

The terminal itself has one or more terminal chips for operating functions of the terminal. Current smartphones, for example, typically have at least three terminal chips, namely a transceiver IC, which carries out the physical radio communication, at least one baseband processor (or equivalently a modem), which performs functions for data transmission via radio communication at the protocol level, and an application processor, on which the operating system and application software are implemented. As further terminal chips, transceiver ICs may be provided for other radio channels, in particular for short-range radio channels such as NFC (NFC: near field communication) or Bluetooth.

The subscriber identity module can be designed in a variety of form factors, including plug-in, embedded, integrated, and software. Plug-in and embedded subscriber identity modules are arranged on a dedicated, separate chip or system-on-chip (SoC). Examples of plug-ins are SIM card (SIM=Subscriber Identity Module) or USIM card (Universal SIM) or UICC (Universal Integrated Circuit Card), which contact the terminal device via a card reader. Alternatively, the dedicated chip can be integrated into a housing that can be or is soldered into the terminal. A solderable/ soldered subscriber identity module is given the prefix "embedded" and referred to as an eUICC, where e stands for embedded, and the rest of the designation is taken from the correspondingly equipped plug-in. Further possible form factors of a subscriber identity module are integrated subscriber identity modules, which are integrated together on a terminal chip or SoC (system-on-chip) of the terminal, and thus do not have their own chip. Integrated subscriber identity modules are provided with the prefix "integrated" and referred to, for example, as integrated UICC, iUICC. Further possible form factors of a subscriber identity module are pure software modules with the functionality of a subscriber identity module, which are integrated into a terminal chip.

Current operating systems for mobile devices, such as Android, allow access operations to the subscriber identity module (SIM accesses) at the application level via various APIs (API=Application Programming Interface), for example the OpenMobile API described in [3] [OM API] or the Device API described in [4] [Device API]. Multiple API classes (classes) are defined in [3], including the SE Service API. In addition, there is the Telephony API, which was defined by Google.

PRIOR ART

Document [1] [SEAC] GlobalPlatform Device Technology, Secure Element Access Control, Version 1.1, Public Release, September 2014, Document Reference GPD-_SPE_013, describes access rules that govern the access by a mobile device to applications in a secure element. A secure element in [1] is a tamper-proof component used in a unit (device) to provide security, trust, and a multi-application environment. For example, the secure element form factor can be that of a Universal Integrated Circuit Card (UICC) or embedded Secure Element (eSE).

The access rules from [1] are also applied in connection with subscriber identity modules.

Document [1] defines the Access Rule Application ARA implemented in the secure element.

FIG. 1 shows FIG. 2-1 taken from [1], which illustrates an elementary secure element with a single Issuer Security Domain (security domain) SD and a single Access Rule Application Master ARA-M. The Access Rule Application Master ARA-M controls the access of the device to the secure element by means of Access Rules, using the Access Control Enforcer implemented in the device. FIG. 1 or FIG. 2-1 reflects a typical UICC or SIM card with a permanently implemented profile of a single network operator.

FIG. 2 shows FIG. 2-2, which is also taken from [1], which represents a secure element with an Issuer Security Domain (security domain) SD and a plurality of Application Provider Security Domains. An Access Rule Application ARA-M or ARA-C is contained in the Issuer Security Domain and in each Application Provider Security Domain. The Access Rule Application (ARA application) master ARA-M in the Issuer Security Domain (SGP.22:ISD-P) uses access rules of the publisher of the secure element to control the access of the device to the secure element, more precisely to the issuer security domain, by means of the access control enforcer implemented in the device. The respective Access Rule Application (ARA application) client ARA-C uses access rules of the respective application provider to control the access by the device to the respective Application Provider Security Domain (SGP.22: AP-SD under the ISD-P).

Reference [1] provides in Chapter 5 that access rules can be managed via commands that are received by means of remote application management (RAM), in the secure element. In particular, by means of the remote management new access rules can be stored in the secure element, deleted from the secure element, and changed and updated in the secure element. To communicate with the secure element, [1] proposes a secure communication channel, "secure channel", in accordance with Global Platform specifications. Remote Application Management (RAM) assumes that the commands for the access rules are sent from a remote (REMOTE) server to the secure element.

Users of consumer terminals such as smartphones with a subscriber identity module (eUICC) or mobile-enabled tablets commonly load applications into their terminals, for example apps from app stores. In this case, an application can also be loaded into a terminal that is supposed to have access to the subscriber identity module but does not receive access, as the access rules (ARA Access Rules) of the ARA application in the subscriber identity module prohibit this.

Currently, the access rules for ISD-Ps and their profiles (i.e. in the model of [1] Application Provider Security Domains) are defined by the network operator (MNO) and can only be managed by the network operator via remote management OTA (Over-The-Air), in particular newly stored, deleted or changed in the subscriber identity module.

Users change the inventory of apps from app stores on their terminal device, sometimes very rapidly and very frequently. It would therefore be desirable for users to be able to adapt the access rules of the ARA application in the subscriber identity module themselves, in accordance with the applications currently contained in the terminal (in particular apps from app stores).

For secure elements in other areas of application, such as payment cards or digital payment solutions or identification documents, in which an ARA application is used, there may also be a desire to allow the user to adapt ARA access rules.

SUMMARY OF THE INVENTION

The object of the invention is to create a secure element with an ARA application, which enables flexible adaptation of the access options to SE applications in the secure element.

The secure element comprises an SE application implemented therein or is configured to implement an SE application therein, and further comprises:—an SE terminal interface to a terminal, in conjunction with which the secure element is able to be operated; —an ARA application and ARA access rules, by means of which access operations from applications implemented in the terminal to SE applications implemented or able to be implemented in the secure element via the SE terminal interface are controlled.

The secure element is characterized by:

an ARA user interface, which is configured:

to receive user commands that are entered by a user on a user interface provided on the terminal or on the secure element;

to forward received user commands to the ARA application in the secure element; and to prompt the ARA application to apply forwarded user commands to the ARA application.

In contrast to previous management options for the ARA application, the user is not dependent on waiting for a management action of a remote server and optionally requesting this management action from the remote server, but instead can prompt a management action locally on his/her terminal via the ARA user interface. This enables the user to respond locally him/herself and adapt the ARA application accordingly if access requirements to SE applications of the secure element are changed on the user's terminal, for example by new applications downloaded to the terminal device.

Therefore, a secure element is created, which enables a flexible adaptation of the access options to SE applications in the secure element.

In the context of the invention, the term terminal is understood to include a device within the meaning of document [1] [SEAC].

The ARA user interface is understood in particular as a program code interface between program codes, which allows user commands to be supplied to the ARA application. In contrast, the user interface is designed to accept user commands from the user. A typical user interface is formed by the control element of a smartphone or tablet PC, such as a touch display, keys and/or voice input interfaces (microphone).

Optionally, the user commands are designed to manage ARA access rules, and the application of the user command to the ARA application comprises managing the ARA access rules corresponding to the user commands.

The management is provided by one or more of the following management actions:

generating a new ARA access rule;

storing a new ARA access rule in the secure element;

deleting an ARA access rule stored in the secure element;

changing, in particular upgrading to a newer version or any other type of change, an ARA access rule stored in the secure element.

Optionally, the management involves generating or adapting and storing an ARA access rule in the secure element for an application that has been newly loaded into the terminal and for which there is no existing or no suitable ARA access rule in the secure element. In particular, the application can be downloaded to the terminal from an app store.

The user interface can optionally be provided in the terminal.

Optionally, the secure element is additionally configured to receive the user commands from an ARA configuration application which is implemented in the terminal and is or is able to be coupled between the user interface and the ARA user interface.

In this embodiment, the user commands are forwarded to the ARA user interface of the secure element in the terminal by the ARA configuration application and converted as required into (understandable) instructions that can be interpreted by the ARA user interface. Specifically, the user command or instruction can instruct the ARA user interface to generate a new ARA access rule and store it in the secure element, or to modify an existing ARA access rule.

Optionally, the user interface and the ARA configuration application are both implemented in the terminal, and the ARA user interface in the secure element accepts the user commands from the ARA configuration application in the terminal.

In particular, subscriber identity modules for mobile terminals often do not have their own user interface, but rather receive user commands and other user inputs via the mobile terminal, optionally via SIM toolkit commands or card toolkit commands. Alternatively, however, there are also NFC SIM cards as subscriber identity modules with their own contactless user interface, which a user can access by bypassing the mobile terminal in which the subscriber identity module is operated. A corresponding embodiment is described below.

In particular, the ARA configuration application in a mobile terminal can be designed as an app which can be downloaded into the terminal from an app store, for example. Accordingly, the ARA configuration application is optionally able to be operated by a user like any app from an app store. The additional ARA configuration application enables the technical solution to be separated into a machine-like ARA user interface on the one hand and an intuitively operable ARA configuration application on the other. This separation has the advantage of increasing operating convenience for the user. Further advantages that can be achieved with an ARA configuration application are described below.

The user interface can optionally be provided in the secure element, and in such a manner that a user can contact it directly, bypassing a terminal device with or in which the secure element is operated, for example as an NFC interface of the secure element.

Optionally, the secure element further comprises an ARA configuration application that is or is able to be coupled between the user interface and the ARA user interface, which is configured to direct user commands to the ARA application. Optionally, the ARA user interface and the ARA configuration application are provided in the secure element. In particular, the user interface, if it is provided in the secure element, is optionally a contactless interface such as an NFC interface. As an ARA configuration application in the secure element an application loaded specifically into the secure element can optionally be used, or an application in the terminal/device that uses the telephony API or the SE service API in order to perform a configuration in the ARA-M or ARA-C.

User commands that are transported across multiple applications can optionally be processed and/or modified by applications involved in the transport (e.g. by the ARA configuration application), or/and can be provided with additional items such as hash values, signatures and the like.

Optionally, the secure element further comprises a timer, which is configured to cause user commands received at the ARA user interface to be applied to the ARA application only during a limited time interval and no longer to be applied to the ARA application after the time interval has expired.

Optionally, the timer is generated and started by a secure element command, such as a SIM Toolkit command or Card Toolkit command, in which the time interval is set during which the timer runs until it expires. In this embodiment, commands received at the ARA user interface are applied to the ARA application from the time the timer is generated and within the time interval, and not applied or/and not forwarded outside the time interval, after the timer has expired. Within the time interval, for example, an ARA access rule can be generated for an application that is newly loaded into the terminal and stored to the secure element. If, after the timer has expired, a command is received to generate a new ARA access rule, no ARA access rule is generated. To this end, a new timer must be generated and started.

The ARA user interface can optionally be designed as a standalone application. Optionally, the ARA user interface, in particular if it is provided in the terminal, can be integrated into the ARA application, for example as an additional functional program code module.

The ARA configuration application can optionally be designed as a standalone application. Optionally, the ARA configuration application, in particular if it is provided in the terminal, can be integrated into the ARA application, for example as an additional functional program code module.

The secure element can optionally be designed as a subscriber identity module, for operation in conjunction with (as the terminal) a mobile terminal, wherein one or more of the following is or are provided as the SE application:

a profile (subscription profile, in particular in the sense of SGP.22);

an application associated with a profile;

an application that is or is able to be implemented in the secure element independently of a profile.

Applications that are associated with a profile or are independent of a profile may be applications in the field of mobile radio communications, or applications outside the field of mobile radio communications, such as payment applications or identity applications.

A station comprises a secure element and a terminal, in particular a mobile terminal.

The terminal optionally comprises the user interface on which the user commands are entered and the ARA configuration application.

A method according to the invention for managing a secure element is characterized by the steps:

on an ARA user interface:

receiving a user command that is entered by a user on a user interface of the terminal or the secure element;

forwarding the received user command to the ARA application; and prompting the ARA application to apply the forwarded user command to the ARA application;

applying the user command by means of the ARA application, in response to the prompting.

Optionally, the user command is designed to manage ARA access rules, wherein the application of the user command comprises the management of the ARA access rules, wherein one or more of the following management measures is or are provided as the management:

generating a new ARA access rule;

storing a new ARA access rule in the secure element;

deleting an ARA access rule stored in the secure element;

changing an ARA access rule stored in the secure element.

A method according to the invention for managing a station optionally comprises:

downloading a target application to the terminal;

managing according to the invention a secure element, including management of ARA access rules;

wherein managing the ARA access rules comprises:

generating a new ARA access rule for the target application, by means of which the target application in particular is allowed access to SE applications of the secure element according to the newly generated ARA access rule; and storing the newly generated ARA access rule in the secure element.

Optionally, the ARA access rules are managed using an ARA configuration application as described above.

Optionally, the ARA configuration application provides the facility to register target applications in the ARA configuration application. A registered target application can be granted either fixed or definable permissions. For example, only target applications that are registered with the ARA configuration application are granted permission to obtain an ARA access rule that allows the target application access to SE applications of the secure element.

Optionally, when registering a target application in the ARA configuration application, the target applications must be authenticated against the ARA configuration application.

The registration of the target application can be done, for example, by means of a hash value over components of the target application, or by means of an applet identifier such as an AID of the target application.

An essential advantage of the invention is that the user can actively influence the ARA access rules via the local ARA user interface, in particular locally on his/her terminal. An additional ARA configuration application can enable further functionalities to be implemented and to increase the convenience for the user. As an extension, the ARA user interface can provide the facility to initiate management of ARA access rules via remote management OTA (Over-The-Air). If Access Rule Files ARF according to [1] [SEAC] are used in the file system of the secure element, remote management can take place, in particular in the form of remote file management.

BRIEF DESCRIPTION OF THE DRAWINGS

In the following the invention is explained in further detail based on exemplary embodiments and by reference to the drawings, in which:

FIG. 3 shows possible applications of the invention to typical implementations of ARA applications according to [1] in an eUICC according to [2];

FIG. 4 shows a detailed view of a terminal and a secure element with a security domain SD with an ARA application, according to multiple embodiments of the invention;

DETAILED DESCRIPTION OF THE EXEMPLARY EMBODIMENTS

Figure 1:
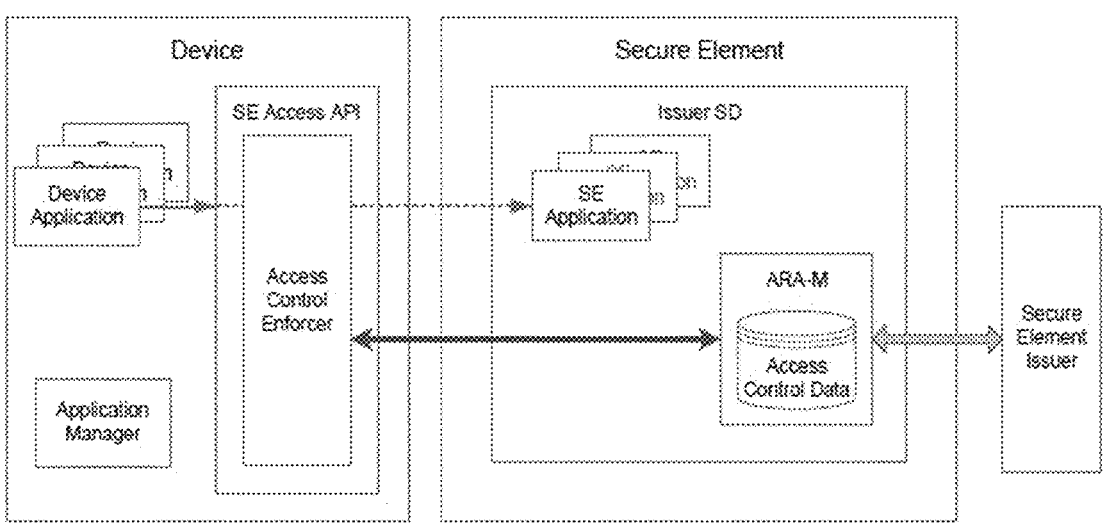
FIG. 1 shows an elementary secure element having a single Issuer Security Domain SD and a single Access Rule Application Master ARA-M, according to the prior art [1], FIG. 2-1.
Figure 2:
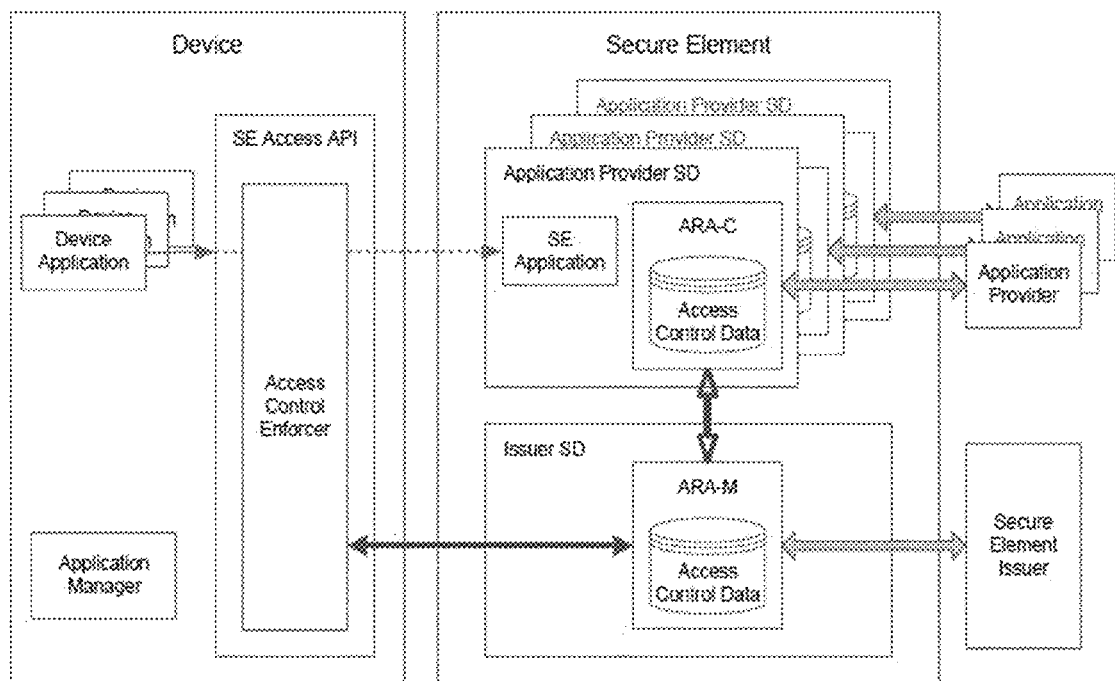
FIG. 2 shows a secure element with an Issuer Security Domain SD with an Access Rule Application ARA-M, and a plurality of Application Provider Security Domains each with an Access Rule Application ARA-C, according to the prior art [1], FIG. 2-2.

FIGS. 1 and 2 show two configurations of ARA applications from document [1] from the prior art, which are suitable for the application of the invention. The further configurations of ARA applications shown in [1] are also suitable for the application of the invention.

FIG. 3 shows possible applications of the invention to typical implementations of ARA applications according to [1] in an eUICC (as a secure element) according to [2]; FIG. 3 shows more precisely a single profile P of an eUICC, based on FIG. 3 from [2], SGP.22, supplemented by an ARA application Master ARA-M implemented in the network operator security domain MNO-SD, and ARA applications client ARA-C arranged in the sub-security domains. According to embodiments of the invention, an ARA user interface ARA-UI is implemented in the network operator security domain MNO-SD. According to embodiments of the invention, an ARA user interface ARA-UI is implemented in the applet security domain Applet. According to embodiments of the invention, an ARA user interface ARA-UI is implemented in the SSD security domain SSD. According to embodiments of the invention, an ARA user interface ARA-UI is implemented in the CASD (Controlling Authority Security Domain). In the further subordinate or other security domains, such as FileSystem, NAAs (Net Access Applications), according to some embodiments of the invention ARA user interface ARA-UI can also be implemented.

FIG. 4 shows a detailed view of a terminal DEV/ME and a secure element SE/SIM with a security domain SD with an ARA application, according to multiple embodiments of the invention. The terminal DEV/ME contains an Access Control Enforcer ACE according to [1] [SEAC]. The secure element SE/SIM contains an ARA application ARA-X, which can be an ARA-M or ARA-C or ARA-D application according to [1] [SEAC], depending on the type of the Issuer Security Domain ISD. According to the invention, the secure element contains an ARA user application ARA-UI. An interface DEV-SE-IF or ME-SIM-IF is provided between the terminal DEV/ME and the secure element SE/SIM for communication between the terminal DEV/ME and the secure element SE/SIM.

The terminal DEV/ME has a user interface UI (in particular D-UI or ME-UI), via which a user can perform inputs. The user interface UI can be, for example, a touch display, or a keyboard or one or more keys, or a combination of touch display, keyboard, and/or one or more keys.

According to some embodiments, user entries on the user interface UI are forwarded to the secure element SE/SIM via an STK application (STK=SIM toolkit) or CTK application (CTK=Card toolkit) of the terminal DEV/ME, and in this case directly forwarded to the ARA user application ARA-UI.

According to some embodiments, the terminal DEV/ME also contains an ARA configuration application ARA-Config-App. In these embodiments, user inputs on the user interface UI are forwarded, for example, to the ARA configuration application ARA-Config-App. The ARA configuration application ARA-Config-App makes the user inputs of the ARA application ARA-X available in the secure element SE/SIM, and works in conjunction with the Access Control Enforcer ACE of the terminal DEV/ME.

According to some embodiments, an arbitrary terminal device DEV with an arbitrary secure element SE is shown in FIG. 4. The Issuer Security Domain ISD provides for an ARA application ARA-X corresponding to the type of ISD.

According to some embodiments, FIG. 4 shows a mobile terminal ME in the sense of [2] [SGP.22], and a subscriber identity module or eUICC SIM in the sense of [2] [SGP.22]. In these embodiments, an MNO-SD is provided in the secure element as the security domain SD, in which an ARA application master ARA-M according to [1] is provided. According to some embodiments, a subdomain SSD (Supplementary Security Domain) of a profile P is provided in the secure element as a security domain SD, wherein an ARA application client ARA-C according to [1] is provided in the SSD.

Figure 5:
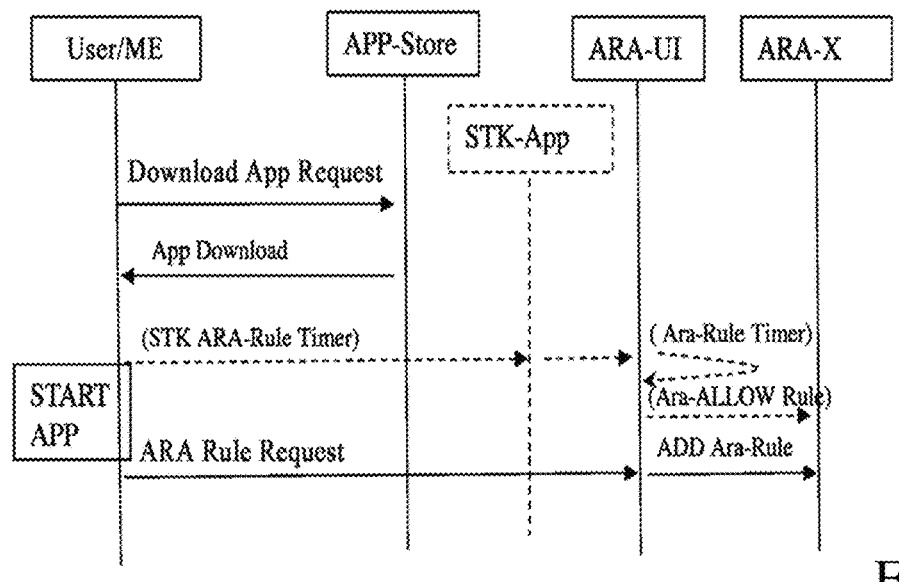
FIG. 5 shows a flowchart for illustrating a method for managing a secure element, comprising managing ARA access rules in response to a user command, according to embodiments of the invention.

FIG. 5 shows a flowchart for illustrating a method for managing a secure element SE/SIM, comprising managing ARA access rules in response to a user command, according to embodiments of the invention. The method is illustrated by way of example using a terminal device, which is a mobile terminal ME in the form of a smartphone. A Sim Toolkit application STK-App is implemented in the terminal ME. The secure element SE/SIM is designed as a subscriber identity module SIM (eUICC). The secure element SE/SIM implements an ARA application ARA-X and ARA access rules for the ARA application ARA-X. An ARA user interface ARA-UI is also implemented in the secure element SE/SIM.

According to FIG. 5, the user visits an app store by means of the touch display and optionally keys on his/her smartphone, as the user interface UI of the terminal ME, and sends a request to the app store to download a specific app to the terminal ME, hereafter referred to as the target app. The target app is downloaded from the app store to the device ME. The target app would need access to applets (SE applications) of the secure element SE of the terminal ME, but does not have this access, since the newly downloaded target app is not entered in the ARA access rules (Access Rules) of the ARA application (Access Rule Application).

According to some embodiments of the invention, the ARA application does not allow direct processing of ARA access rules by the user but requires that the user first enables the ARA application for processing.

According to embodiments of the invention, the ARA application allows the user to activate the ARA application for processing by means of a SIM toolkit command, or in the case of a general secure element, a Card toolkit command. For example, the user sends a Sim Toolkit command Timer (Time_indication) to the ARA user interface ARA-UI via the user interface UI of the terminal. The SIM Toolkit command Timer (Time_indication) causes the ARA user interface ARA-UI to generate an ARA access rule ARA-ALLOW that allows ARA access rules to be processed during a time interval specified by "Time_indication". For example, "Time_indication" can be a period from 1 to 10 minutes, for example, five minutes. The ARA user interface ARA-UI sends the ARA access rule ARA-ALLOW to the ARA application ARA-X. However, the method can also proceed without the timer (without the dotted arrows in the figure).

The user now starts, at the latest, the downloaded target app. The target app or the user sends a request to the ARA user interface to manage the ARA access rules. The request requires that the target app be granted access to SE applications (optionally all or only specific SE applications) of the secure element SE. The ARA user interface ARA-UI generates an ARA access rule that grants the target app the requested access to the secure element and sends the ARA access rule to the ARA application ARA-X. The ARA application ARA-X enters the newly generated ARA access rule sent by the ARA user interface ARA-UI into the ARA access rules. Subsequently, the target app has access to the secure element SE, as defined in the new ARA access rule.

The access to SE applications of the secure element SE requested with the user command and specified in the ARA access rule can optionally include all SE applications or only certain specified SE applications.

Figure 6:
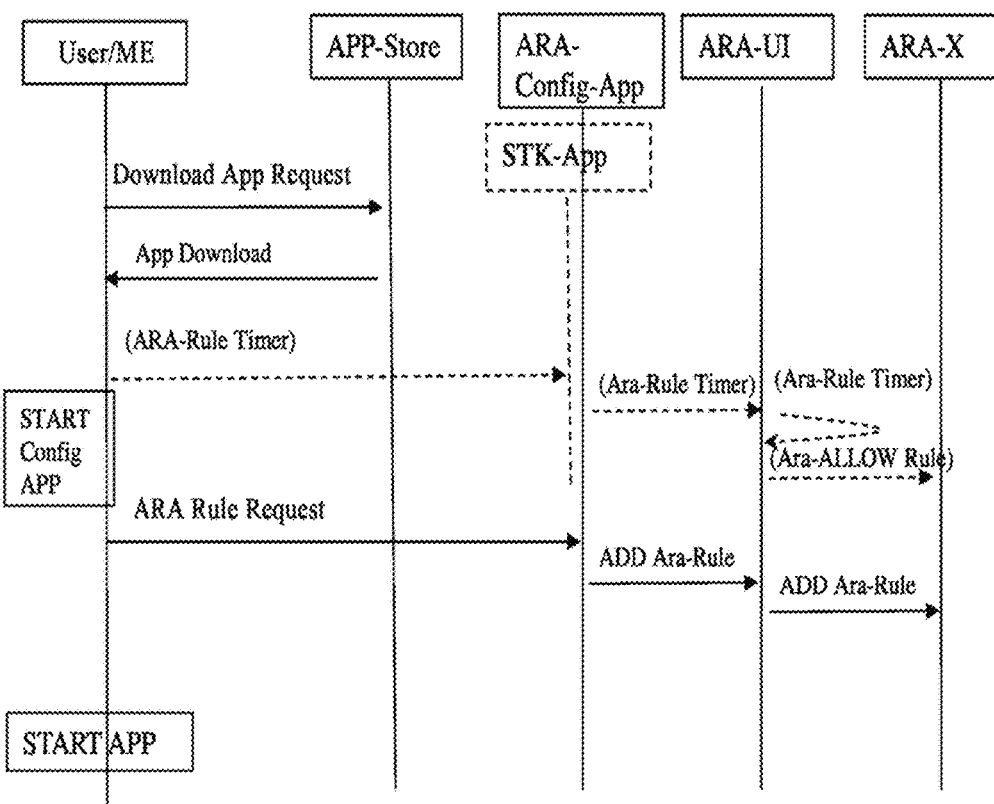
FIG. 6 shows a flowchart for illustrating a method for managing a secure element, comprising managing ARA access rules in response to a user command using an ARA configuration application, according to embodiments of the invention.

FIG. 6 shows a flowchart for illustrating a method for managing a secure element SE, comprising managing ARA access rules in response to a user command using an ARA configuration application ARA-Config-App, according to embodiments of the invention.

In comparison to the method shown in FIG. 5, an ARA configuration application ARA-Config-App is additionally provided in the terminal device ME in the method shown in FIG. 6. The processes up to the download of the target app take place, for example, as in the example from FIG. 5.

The optional timer can optionally be set as in the method according to FIG. 5 by means of the SIM toolkit application STK-App or Card-toolkit application CTK-App, as described in FIG. 5, or alternatively set by the ARA configuration application ARA-Config-App, otherwise analogously to the timer described in FIG. 5. However, the method can also proceed without the timer (without the dotted arrows in the figure).

After downloading the target app, the ARA configuration application ARA-Config-App is started on the terminal ME, for example by the user by an input on the user interface UI. Optionally, the ARA configuration application ARA-Config-App is displayed as a selectable app (e.g. as an icon or widget) on a display of the terminal ME, so that the user can start it like any app on the terminal ME. Using the ARA configuration application ARA-Config-App of the terminal ME, the user requests that an ARA access rule be created for the newly downloaded target app on the ARA user interface ARA-UI of the secure element SE. The target app does not necessarily have to have been started yet at this point, but it may have been. The ARA user interface ARA-UI generates an ARA access rule that grants the target app the requested access to the secure element SE and sends the ARA access rule to the ARA application ARA-X. The ARA application ARA-X enters the newly generated ARA access rule sent by the ARA user interface ARA-UI into the ARA access rules. Subsequently, the target app has access to the secure element SE, as defined in the new ARA access rule.

At the latest, the target app is then launched. According to another embodiment, after the download of the target app, the target app is launched, and if necessary, the ARA configuration app ARA-Config-app is launched by the target app, and the method is subsequently carried out as described above with reference to FIG. 6, in order to grant the target app access to the desired SE applications of the secure element SE.

CITED DOCUMENTS

[1] SEAC] GlobalPlatform Device Technology, Secure Element Access Control, Version 1.1, Public Release, September 2014, Document reference GPD_SPE_013;
[2] [SGP.22] GSMA SGP.22 RSP Technical Specification, Version 2.2.2, 5 Jun. 2020;
[3] [OM API] GlobalPlatform Technology, Open Mobile API Specification, Version 3.3, Public Release July 2018, Document Reference: GPD_SPE_075;
[4] [Device API] GlobalPlatform Device Technology, Device API Access Control, Version 1.0, Public Release November 2017, Document Reference: GPD_SPE_068.

The invention claimed is:

1. A secure element, the secure element being a hardware device, the secure element comprising:
   a secure-element application implemented in the secure element or a secure-element device configured to implement a secure-element application in the secure element;
   a secure-element terminal interface to a terminal, in conjunction with which the secure element is configured to operate;
   an access-rule application and access-rule application rules stored in the secure element, by means of which access operations from applications implemented in the terminal to secure-element applications implemented or able to be implemented in the secure element via the secure-element terminal interface are controlled; and
   an access-rule application user interface configured to:
      receive user commands that are entered by a user on a user interface provided on the terminal or on the secure element;
      forward received user commands to the access-rule application; and
      prompt the access-rule application to apply forwarded user commands to the access-rule application.

2. The secure element according to claim 1, wherein the user commands are designed to manage the access-rule application access rules, and the application of the user command to the access-rule application comprises the management of the access-rule application access rules,
   wherein one or more of the following management measures is or are provided as the management:
      generating a new access-rule application access rule;

storing a new access-rule application access rule in the secure element;

deleting an access-rule application access rule stored in the secure element;

changing an access-rule application access rule stored in the secure element.

3. The secure element according to claim 1, wherein the secure element is further configured:

to receive the user commands from an access-rule application configuration application implemented in the terminal device, which is or is able to be coupled between the user interface and the access-rule application user interface.

4. The secure element according to claim 1, further comprising:

an access-rule application configuration application which is or is able to be coupled between the user interface and the access-rule application user interface and is configured to direct user commands to the access-rule application.

5. The secure element according to claim 1, further comprising a timer, which is configured to cause user commands received at the access-rule application user interface to be applied to the access-rule application only during a limited time interval and no longer to be applied to the access-rule application after the time interval has expired.

6. The secure element according to claim 5, wherein the timer is configured to be started by an elementary secure-element command entered in the secure element.

7. The secure element according to claim 1, wherein the secure element is configured as a subscriber identity module for operation in conjunction with a mobile terminal as the terminal, wherein one or more of the following is or are provided as the secure-element application:

a profile;

an application associated with a profile;

an application that is or is configured to be implemented in the secure element independently of a profile.

8. A station comprising the secure element according to claim 1, and the terminal.

9. The station according to claim 8, further comprising an access-rule application configuration application which is or is configured to be coupled between the user interface and the access-rule application user interface and is configured to direct user commands to the access-rule application;

wherein the terminal comprises the user interface, on which the user commands are entered, and which comprises the access-rule application configuration application.

10. A method for managing a secure element, the secure element comprising a secure-element application implemented therein or configured to implement a secure-element application therein, the secure element further comprising:

a secure-element terminal interface to a terminal, in conjunction with which the secure element is configured to operate;

an access-rule application and access-rule application access rules, by means of which access operations from applications implemented in the terminal to secure-element applications implemented or configured to be implemented in the secure element via the secure-element terminal interface are controlled; and an access-rule application user interface, the method comprising the steps performed on the access-rule application user interface:

receiving a user command that is entered by a user on a user interface of the terminal or the secure element;

forwarding the received user command to the access-rule application;

prompting the access-rule application to apply the forwarded user command to the access-rule application; and applying the user command by means of the application, in response to the prompting.

11. The method according to claim 10, wherein the user command is designed to manage access-rule application access rules, and wherein the application of the user command comprises the management of the access-rule application access rules, wherein one or more of the following management measures is or are provided as the management:

generating a new access-rule application access rule;

storing a new access-rule application access rule in the secure element;

deleting an access-rule application access rule stored in the secure element;

changing an access-rule application access rule stored in the secure element.

12. A method for managing a station including a terminal and a secure element, comprising managing the secure element by means of the method according to claim 10;

further comprising downloading a target application to the terminal;

wherein managing the access-rule application access rules comprises:

generating a new access-rule application access rule for the target application, by means of which the target application in particular is allowed access to secure-element applications of the secure element according to the newly generated access-rule application access rule; and storing the newly generated access-rule application access rule in the secure element.

13. The method according to claim 12, further comprising registering and/or authenticating the target application with respect to the access-rule application user interface or, if applicable, the access-rule application configuration application, wherein the management comprises:

verifying the registration and/or authentication of the target application by means of the access-rule application user interface or, if applicable, the access-rule application configuration application, and generating a new access-rule application access rule for the target application only if the registration and/or authentication is successfully verified.

14. A hardware storage device having instructions stored therein, which, when executed by one or more processors of a secure element or by one or more processors of a device having a secure element integrated therein, cause the one or more processors of the secure element or the one or more processors of the device to manage the secure element to provide a secure-element application implemented in the secure element, a secure-element terminal interface to a terminal, in conjunction with which the secure element is configured to operate, an access-rule application and access-rule application rules, by means of which access operations from applications implemented in the terminal to secure-element applications implemented or able to be implemented in the secure element via the secure-element terminal interface are controlled, and an access-rule application user interface, wherein the access-rule application user interface is configured to receive user commands that are entered by a user on a user interface provided on the terminal or on the secure element;

forward received user commands to the access-rule application; and prompt the access-rule application to apply forwarded user commands to the access-rule application.

15. The secure element according to claim 1, wherein the secure element is one of:

a plugin universal integrated circuit card, a plugin subscriber identity module, an embedded universal integrated circuit card, a chipset of the terminal comprising an integrated universal integrated circuit card, or a chipset of the terminal comprising a software subscriber identity module.

* * * * *